United States Patent
Takagi et al.

(10) Patent No.: US 11,477,124 B2
(45) Date of Patent: Oct. 18, 2022

(54) NETWORK MANAGEMENT SYSTEM, MANAGEMENT DEVICE, RELAY DEVICE, METHOD, AND PROGRAM

(71) Applicant: NIPPON TELEGRAPH AND TELEPHONE CORPORATION, Tokyo (JP)

(72) Inventors: Masaru Takagi, Musashino (JP); Masahiro Yoshida, Musashino (JP); Kazuya Matsuo, Musashino (JP); Jun Shioda, Musashino (JP); Koya Mori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 38 days.

(21) Appl. No.: 17/252,195

(22) PCT Filed: Jun. 7, 2019

(86) PCT No.: PCT/JP2019/022719
§ 371 (c)(1),
(2) Date: Dec. 14, 2020

(87) PCT Pub. No.: WO2019/240034
PCT Pub. Date: Dec. 19, 2019

(65) Prior Publication Data
US 2021/0258258 A1    Aug. 19, 2021

(30) Foreign Application Priority Data

Jun. 15, 2018  (JP) .............................. JP2018-114719

(51) Int. Cl.
*H04L 47/2425*    (2022.01)
*H04L 43/0817*    (2022.01)
(Continued)

(52) U.S. Cl.
CPC ...... *H04L 47/2433* (2013.01); *H04L 43/0817* (2013.01); *H04L 43/0876* (2013.01); *H04L 43/106* (2013.01); *H04L 47/28* (2013.01)

(58) Field of Classification Search
CPC . H04L 47/2433; H04L 47/28; H04L 43/0817; H04L 43/0876; H04L 43/106;
(Continued)

(56) References Cited

U.S. PATENT DOCUMENTS 10,148,346 B1 * 12/2018 Liu ..................... H04W 16/28
10,187,810 B1 *  1/2019 Liu ..................... H04B 7/15528
(Continued)

FOREIGN PATENT DOCUMENTS

JP    2006309701 A    11/2006
JP    2008015722 A     1/2008
(Continued)

OTHER PUBLICATIONS

"OneM2M The Interoperability Enabler for The Entire M2M and IoT Ecosystem," OneM2M White Paper, Jan. 2015, pp. 1-14.
(Continued)

*Primary Examiner* — Dung B Huynh
(74) *Attorney, Agent, or Firm* — Harness, Dickey & Pierce, P.L.C.

(57) ABSTRACT

The present invention offers a network management technique that can realize effective acquisition of various data transmitted from terminals, while reducing the network congestion. In a network management system including a plurality of terminals that can transmit data, a plurality of destination devices that perform respective predetermined processes based on the data, a relay device arranged between them, and a management device communicable with the terminals, the destination devices, and the relay device, the management device receives a request regarding required
(Continued)

data from the destination devices; and, in response to the request, instructs to integrate data items that are to be relayed to individual destination devices. Upon receipt of the instruction, the relay device identifies and integrates data items that are to be relayed to the individual destination devices from among data items transmitted from the terminals, and transmits the integrated data to corresponding ones of the destination devices, based on the instruction.

7 Claims, 7 Drawing Sheets

(51) Int. Cl.
    *H04L 43/0876*    (2022.01)
    *H04L 43/106*     (2022.01)
    *H04L 47/28*      (2022.01)

(58) Field of Classification Search
    CPC ... H04L 12/2825; H04L 67/12; H04L 67/125; H04W 4/70; H04W 84/22; H04W 88/04; H04W 4/90
    See application file for complete search history.

(56) References Cited

U.S. PATENT DOCUMENTS

| | | | |
|---|---|---|---|
| 10,693,813 B1* | 6/2020 | Jacob Da Silva | H04L 45/28 |
| 2004/0044912 A1* | 3/2004 | Connary | H04L 43/06 709/224 |
| 2006/0230077 A1 | 10/2006 | Satou et al. | |
| 2010/0088417 A1 | 4/2010 | Amemiya et al. | |
| 2011/0194483 A1* | 8/2011 | Ji | H04W 36/0033 370/315 |
| 2013/0285837 A1* | 10/2013 | Uchida | G08C 17/02 340/870.02 |
| 2015/0350018 A1 | 12/2015 | Hui et al. | |
| 2016/0366213 A1* | 12/2016 | Kazanchian | H04B 7/15 |
| 2017/0105057 A1* | 4/2017 | Stamatakis | F24F 11/30 |
| 2017/0223097 A1 | 8/2017 | Zhang et al. | |
| 2018/0062935 A1* | 3/2018 | Dong | H04L 67/10 |
| 2018/0067995 A1* | 3/2018 | Ishii | H04L 43/106 |
| 2018/0091331 A1* | 3/2018 | Agrawal | H04L 12/437 |
| 2018/0115576 A1* | 4/2018 | Ridley | H04L 41/16 |
| 2018/0270843 A1* | 9/2018 | Jiang | H04W 4/38 |
| 2018/0284758 A1* | 10/2018 | Celia | G05B 23/0264 |
| 2018/0309856 A1 | 10/2018 | Tashiro et al. | |
| 2019/0036772 A1* | 1/2019 | Agerstam | H04L 67/566 |
| 2019/0158625 A1* | 5/2019 | Papageorgiou | H04L 43/0811 |
| 2019/0166502 A1* | 5/2019 | Chaskar | H04L 63/1416 |
| 2019/0258532 A1* | 8/2019 | Tokuchi | H04L 67/54 |
| 2020/0312468 A1* | 10/2020 | Yano | H04W 4/70 |
| 2020/0336431 A1* | 10/2020 | Lessmann | H04L 47/28 |
| 2021/0076529 A1* | 3/2021 | Pachoud | H01R 24/20 |
| 2021/0232472 A1* | 7/2021 | Nagaraj | H04L 12/28 |

FOREIGN PATENT DOCUMENTS

| | | |
|---|---|---|
| JP | 2010108479 A | 5/2010 |
| JP | 201468285 A | 4/2014 |
| JP | 2014192661 A | 10/2014 |
| JP | 2017120987 A | 7/2017 |
| JP | 2017123540 A | 7/2017 |
| JP | 2017151559 A | 8/2017 |
| JP | 201893343 A | 6/2018 |
| WO | WO-2014034037 A1 | 3/2014 |
| WO | WO-2016203543 A1 | 12/2016 |

OTHER PUBLICATIONS

International Search Report issued in PCT/JP2019/022719, dated Aug. 27, 2019; ISA/JP.

* cited by examiner

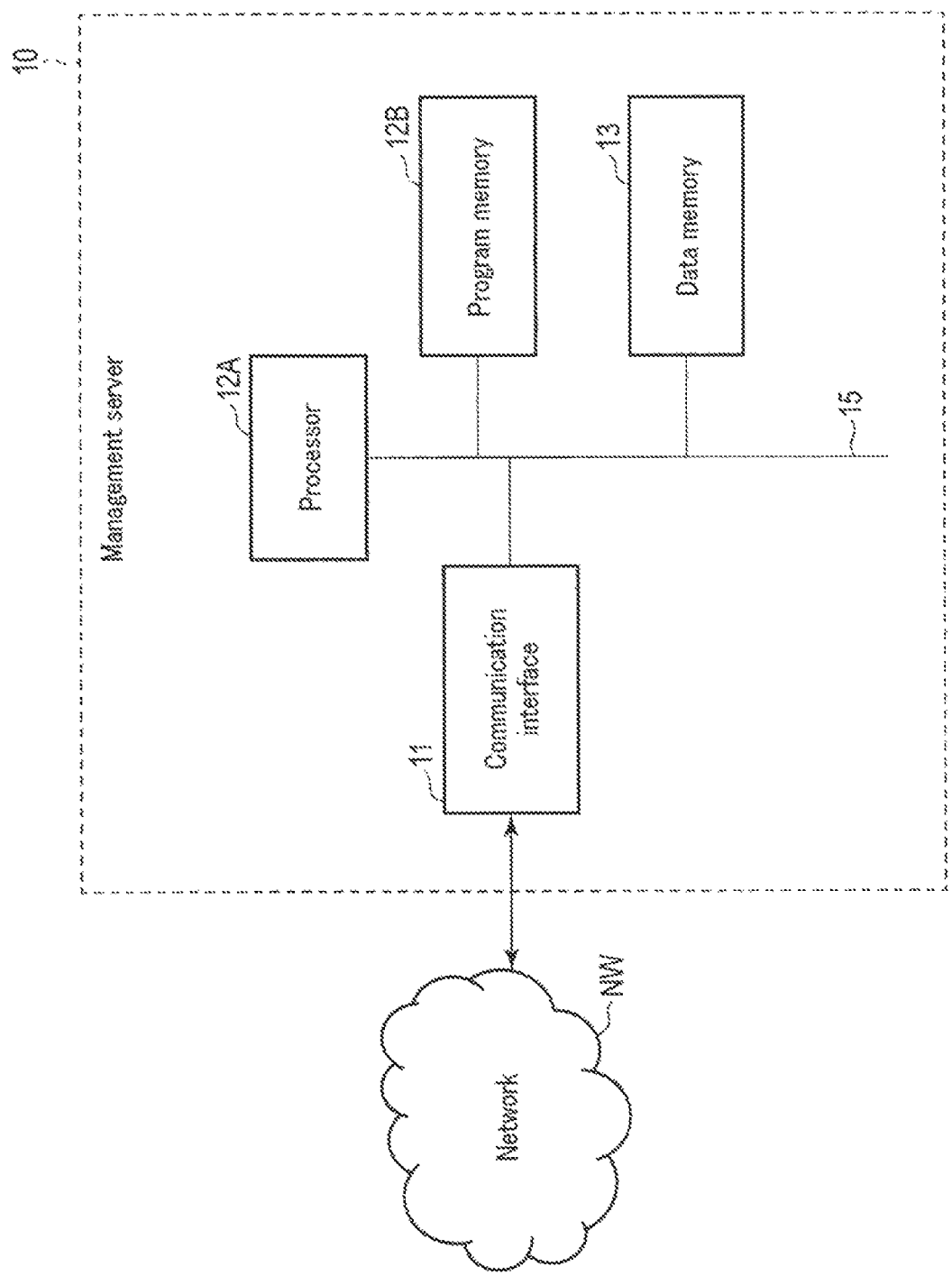
F I G. 2

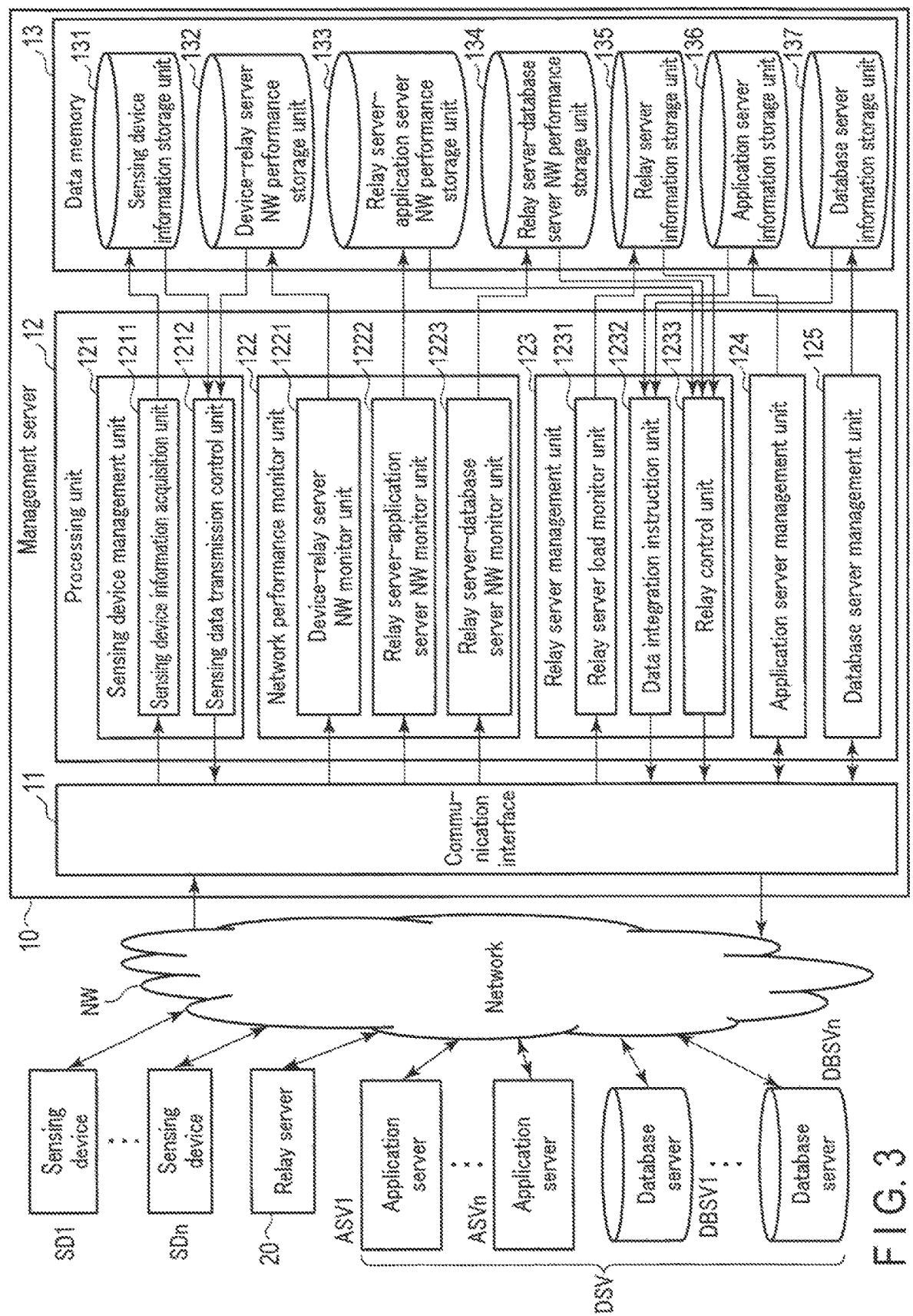
F I G. 3

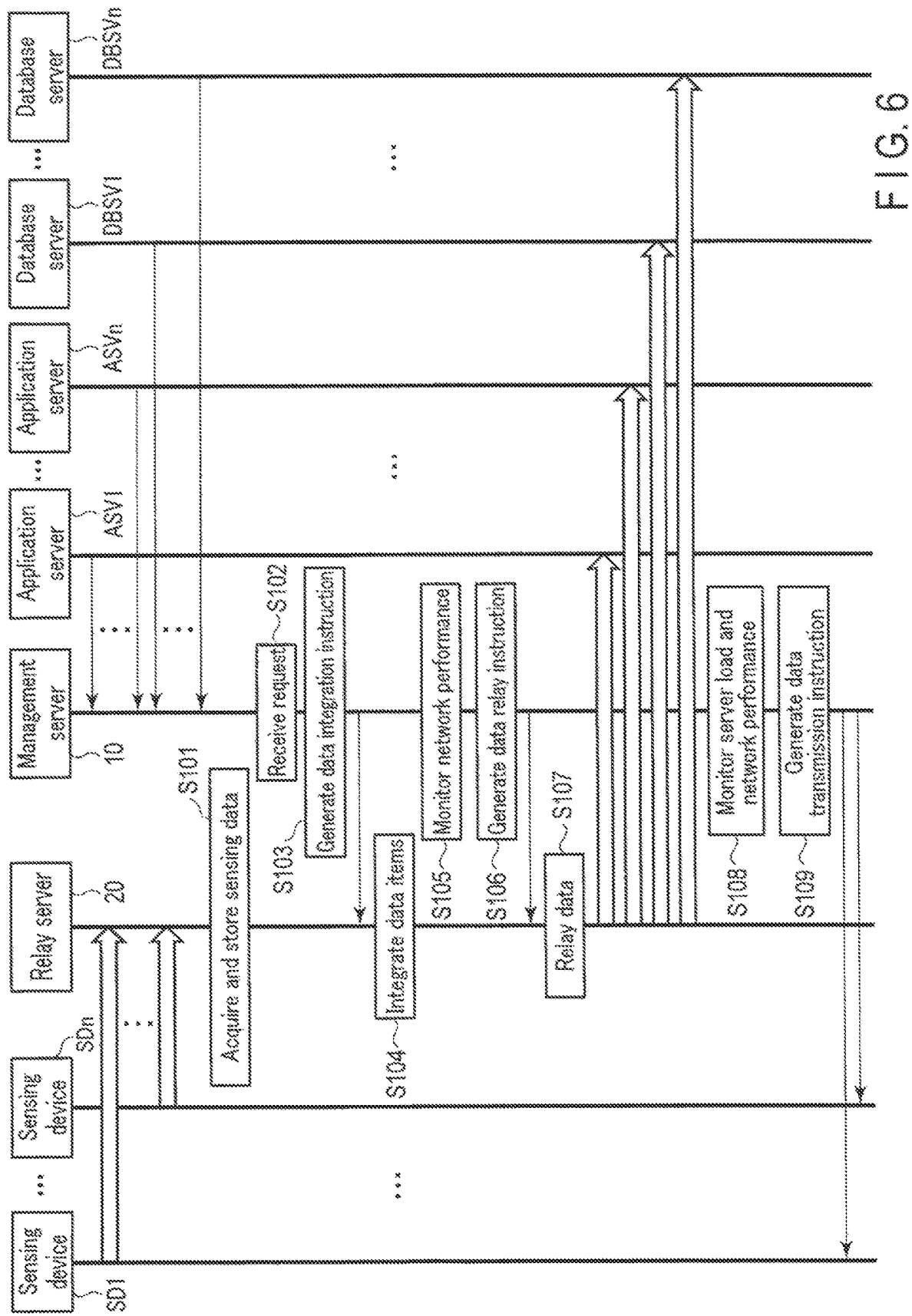
F I G. 6

NETWORK MANAGEMENT SYSTEM, MANAGEMENT DEVICE, RELAY DEVICE, METHOD, AND PROGRAM

CROSS-REFERENCE TO RELATED APPLICATIONS

This is a U.S. national phase application under 35 USC 371 of international application PCT/JP2019/022719, filed on Jun. 7, 2019, which claims priority to Japanese patent application No. 2018-114719, filed on Jun. 15, 2018. The entire disclosures of the above applications are incorporated herein by reference.

FIELD

One aspect of the present invention relates to a network management system, a management device, and a relay device, as well as a method and a program therefor.

BACKGROUND

With the recent spread of Internet of Things (IoT) technology, data collection adopting a wide variety of sensors and analysis of the collected data have been advanced in various fields such as the manufacturing industry, the automobile industry (autonomous driving support), and agriculture. In the IoT, data generated by devices such as sensors (hereinafter, also referred to as "sensing devices" or "data transmitting terminals") connected to a network is collected on clouds and employed for various applications.

A vast number of wide-ranging sensing devices have been used. In addition, various types of data are generated by the sensing devices, and various types of applications using the generated data are available. In order to enhance IoT value creation, use of different kinds of data in combination is essential. There is an increasing demand for a technique of distributing and utilizing data across services of different fields (see Non-patent Literature 1, for example).

CITATION LIST

Non-Patent Literature

Specification_4AS-19F0233P1_US_Harness_20201210_fmk:2517689 4_1
[NON-PATENT LITERATURE 1] "OneM2M The Interoperability Enabler for The Entire M2M and IoT Ecosystem," OneM2M White Paper, January 2015.

SUMMARY

Technical Problem

Conventionally, data from sensing devices provided with a sensor function of acquiring a wide variety of data is transmitted to a database server via a wireless network or a fixed network and temporarily stored therein. The database server stores the data received from the sensing devices in the database, using the time points and the device IDs as keys. An application server that desires to use data needs to select and acquire specific data required for the operation of the application from among the data accumulated in the database. For instance, an application on the application server may issue a query such as SQL to a database to acquire the necessary data. Since the database stores data of time points spanning from the past to the present, data narrowed to a specific time point can be acquired by entering a specific criterion. Data narrowed to a specific device ID can also be acquired by entering a specific criterion.

With a vast amount of data different in data size, acquisition date and time, and acquisition frequency stored in the database, it takes a long time for an application to select (search for) and extract a specific desired data item from the database, which is not efficient.

Furthermore, data items transmitted from the sensing devices differ in data size and acquisition frequency. If a large amount of data is transmitted from devices, or a large number of devices are involved, the data transmitted from the sensing devices amounts to a large volume, causing congestion in different network segments, for example between the sensing devices and the server and between the server and the applications.

The present invention has been conceived in view of the above circumstances. The object of the present invention is to provide a network management technique that can realize efficient acquisition of various data items transmitted from sensing devices while reducing network congestion.

Solution to Problem

In order to solve the above problem, the first aspect of the present invention provides a network management system including a plurality of terminals that can transmit data, a plurality of destination devices that perform respective predetermined processes based on the data transmitted from the terminals, a relay device arranged between the terminals and the destination devices via a network, and a network management device communicable with the terminals, the destination devices, and the relay device, wherein the network management device includes: a request receiving unit configured to receive from the destination devices a request regarding data required by individual ones of the destination devices; and a relay data instruction unit configured to, in response to the request, generate a relay data instruction signal that instructs an attribute of the data to be relayed to the individual ones of the destination devices and transmit the relay data instruction signal to the relay device, and the relay device includes: an instruction signal acquisition unit configured to acquire the relay data instruction signal transmitted from the network management device; a data integration unit configured to, based on the relay data instruction signal, identify and integrate data items that are to be relayed to the individual ones of the destination devices from among data items transmitted from the terminals; and a relay data transmission control unit configured to transmit the integrated data to corresponding ones of the destination devices.

According to the second aspect of the present invention, the network management device of the first aspect further includes: a network performance monitor unit configured to monitor performance of the network; and a transmission control unit configured to, based on a monitoring result of the performance of the network, generate a control signal to control at least one of an amount of data transmitted from the terminals and an amount of data transmitted from the relay device and transmit the control signal to at least one of the terminals and the relay device.

According to the third aspect of the present invention, a network management device is communicable with a plurality of terminals that can transmit data, with a plurality of destination devices that perform respective predetermined processes based on the data transmitted from the terminals, and with a relay device arranged between the terminals and the destination devices via a network, and the management device includes: a request receiving unit configured to receive from individual ones of the destination devices a request regarding data required by the destination devices; and a relay data instruction unit configured to, in response to the request, generate a relay data instruction signal that instructs an attribute of the data to be relayed to the individual ones of the destination devices and transmit the relay data instruction signal to the relay device.

According to the fourth aspect of the present invention, a relay device is arranged via a network between a plurality of terminals that can transmit data and a plurality of destination devices that perform respective predetermined processes based on the data transmitted from the terminals, and the relay device includes: an instruction signal acquisition unit configured to acquire a relay data instruction signal that instructs data to be relayed to individual ones of the destination devices; a data integration unit configured to, based on the relay data instruction signal, identify and integrate, from among data items transmitted from the terminals, data items to be relayed to the individual ones of the destination devices; and a relay data transmission control unit configured to transmit the integrated data items to corresponding ones of the destination devices.

Advantageous Effects of Invention

According to the first, third and fourth aspects of the present invention, various data items transmitted from a plurality of terminals are temporarily fetched by a relay device arranged between the terminals and destination devices. In response to an instruction from a network management device, the relay device distributes data items and integrates them for individual destination devices so that the integrated data can be directly transmitted from the relay device to the individual destination devices. As a result, individual destination devices can efficiently acquire the desired data without the need to retrieve a specific data item from a database that stores a vast amount of wide-ranging data. This can significantly reduce the processing load of the destination devices, and also can improve the responsiveness of the application in a destination device using the data. Furthermore, with the traffic minimized between the relay device and the destination devices, the network congestion can be reduced.

According to the second aspect of the present invention, the network management device monitors the performance of a network associated with the relay device, and transmits a control signal for controlling a transmission amount of data to a terminal transmitting the data or the relay device in accordance with the monitoring result. When it is determined, as a result of monitoring the performance of the network, that the load of the network or the relay device has been increased, the transmission amount from the terminal or the relay device can be controlled so as to reduce the load. Thus, the congestion of the entire network and the processing load of the relay device can be flexibly and effectively reduced.

That is, according to the aspects of the present invention, a network management technique can be offered which can efficiently acquire various data items transmitted from terminals, while reducing the network congestion.

BRIEF DESCRIPTION OF THE DRAWINGS

FIG. 2 is a block diagram showing a hardware configuration of a management server according to an embodiment of the present invention.

FIG. 3 is a block diagram showing a software configuration of the management server according to an embodiment of the present invention.

FIG. 6 is a sequence diagram showing an exemplary flow of control signals in the network management system shown in FIG. 1.

DETAILED DESCRIPTION

Figure 1:
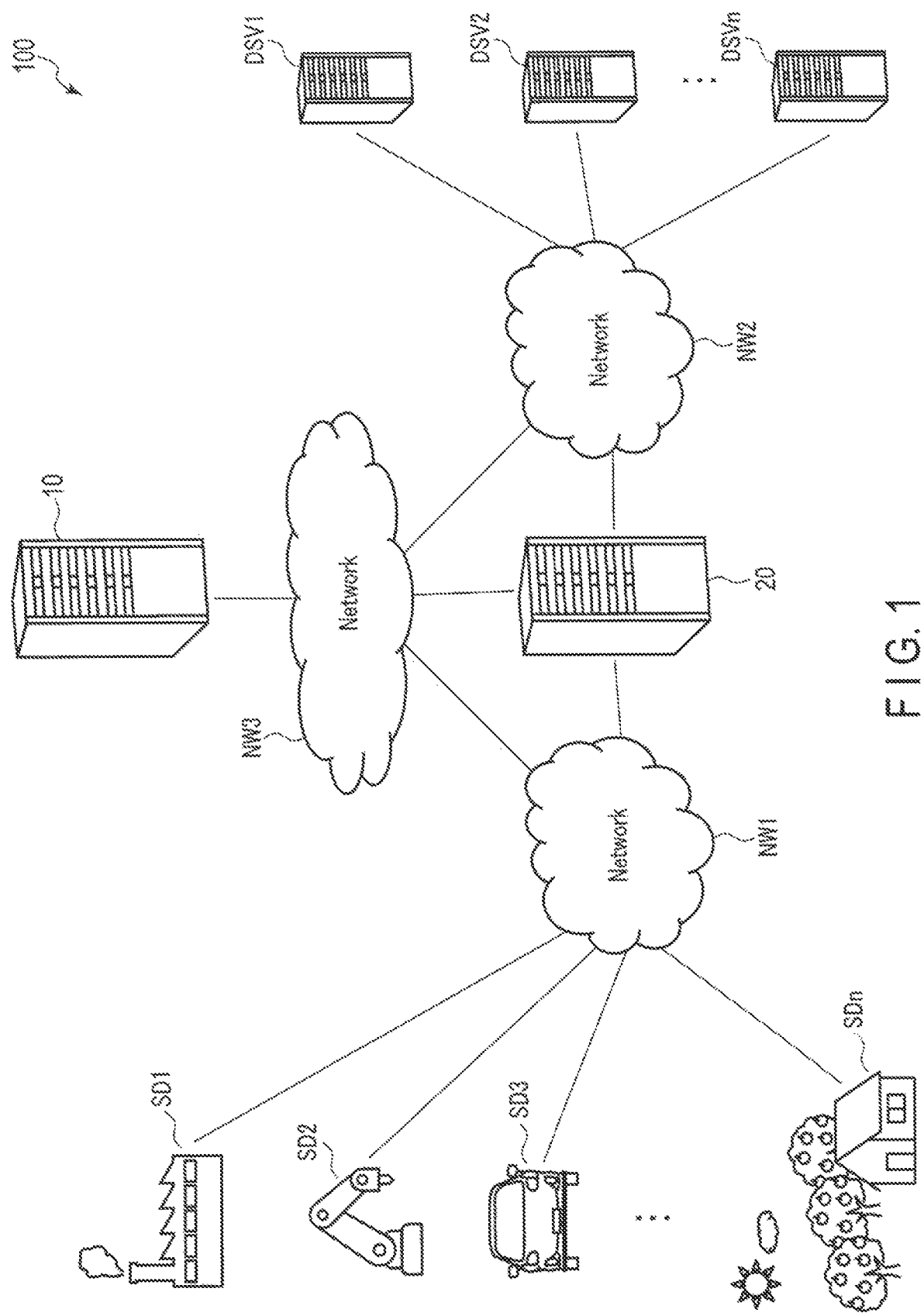
FIG. 1 is a diagram showing the overall configuration of a network management system according to an embodiment of the present invention.

Embodiments of the present invention will be described below by referring to the drawings.

Embodiment 1

(Configuration)
(1) System

FIG. 1 is a diagram showing the overall configuration of a network management system 100 according to the first embodiment of the present invention. The system 100 includes a plurality of sensing devices SD1, SD2, SD3, . . . , SDn (which may also be together referred to as "sensing devices SD") as data transmitting terminals capable of communicating with each other via communication networks NW1, NW2, and NW3; destination servers DSV1, DSV2, . . . , DSVn (which may also be together referred to as "destination servers DSV") as destination devices, a relay server 20 as a relay device, and a management server 10 as a management device for managing the entire network including these devices.

Each of the communication networks NW1, NW2, and NW3 includes an Internet Protocol (IP) network such as the Internet, and a plurality of access networks for making an access to the IP network. As an access network, not only a wired network using optical fibers, but also a cellular phone network operating under a standard such as 3G or 4G, or a wireless local area network (LAN) can be adopted. The communication networks NW1, NW2, and NW3 need not be separate networks, and two or three of NW1, NW2, and NW3 may constitute a single network. These communication networks NW1, NW2, and NW3 may be together referred to as networks NW.

A sensing device SD that serves as a data transmitting terminal may be an IoT device having a plurality of sensor functions, which collects various data in any desired field such as the manufacturing industry, the automobile industry (autonomous driving), agriculture, medicine, health care, the distribution industry, the financial industry, and other service industries. The sensing device SD transmits the collected data to the relay server 20 through the network NW. Furthermore, the operation of the sensing device SD is managed by the management server 10 through the network NW.

A destination server DSV may be an application server or a database server (including a server managed and operated on the Web, for example, by a service provider) configured to perform predetermined processing based on the data collected by the sensing devices SD. The destination server DSV receives necessary data from the relay server 20 through the network NW. Furthermore, the operation of the destination server DSV is managed through the network NW by the management server 10.

The relay server 20 may include a server computer, a personal computer, or the like. The relay server 20 is arranged between the sensing devices SD and the destination servers DSV by way of the network NW to receive data collected by the sensing devices SD and relay the data to individual destination servers DSV. Furthermore, the operation of the relay server 20 is managed by the management server 10 through the network NW.

According to the present embodiment, the relay server 20 may receive the data transmitted by the sensing devices SD through the network NW, receive an instruction from the management server 10, identify, classify, integrate and store the data required by individual destination servers DSV in accordance with the instruction, and thereafter transmit the data to the corresponding destination servers DSV. In this embodiment, integrating data indicates creating a single archive from plural types of data having the same data creation date/time, using a compression technique such as ZIP. Moreover, the relay server 20 can also determine the priority order for the integrated data based on the instruction from the management server 10, and relay the integrated data to the destination servers DSV. For instance, priority control may be performed in a manner such that, among the destination servers DSV, the integrated data is transmitted to the application server ASV with a higher priority, while the integrated data is transmitted to the database server DBSV when there is leeway in the load of the network or the server.

The management server 10 communicates with the sensing devices SD, the relay server 20, and the destination servers DSV through the network NW, and manages and controls their operations. The management targets of the management server 10 are therefore not limited to the network NW. The configurations of the management server 10 and the relay server 20 will be further described.

(2) Management Server (2-1) Hardware Configuration

FIG. 2 is a block diagram showing an example of the hardware configuration of the management server 10 illustrated in FIG. 1.

The management server 10 may be a server computer, a personal computer, or the like, and may include a hardware processor 12A such as a central processing unit (CPU). To this hardware processor 12A, a program memory 12B, a data memory 13, and a communication interface 11 are connected through a bus 15.

The communication interface 11 enables data to be transmitted to and received from various devices through the network NW. As a communication protocol, the protocol defined by the network NW is employed. The communication interface 11 may include one or more wired or wireless communication interfaces. As a wired interface, a wired LAN may be employed. As a wireless interface, an interface adopting a low-power wireless data communication standard such as a wireless LAN or Bluetooth (registered trademark) may be employed.

The program memory 12B serves as a storage medium, for which a combination of a nonvolatile memory such as a hard disk drive (HDD) or a solid state drive (SSD), in which writing and reading can be conducted at any time, and a nonvolatile memory such as a read only memory (ROM) may be used. Programs necessary for executing various processes are stored therein.

The data memory 13 serves as a storage medium, for which a combination of a nonvolatile memory such as an HDD or SSD, in which writing and reading can be conducted at any time, and a volatile memory such as a random access memory (RAM) may be used. The data memory 13 is used for storage of data acquired and created during various processes.

(2-2) Software Configuration

FIG. 3 is a block diagram showing the software configuration of the management server 10 of FIG. 1 associated with the hardware configuration of FIG. 2.

As described above, the management server 10 can communicate through the network NW with the sensing devices SD1, . . . , SDn that serve as data transmitting terminals, the relay server 20, the application servers ASV1, . . . , ASVn (which may also be referred to together as "application servers ASV") and database servers DBSV1, . . . , DBSVn (which may also referred to as "database servers DBSV") that serve as destination servers DSV. As mentioned above, the sensing devices SD may include various devices. An application server ASV may include one or more applications. Similarly, a database server DBSV may include one or more databases. The destination servers DSV may include, in addition to the application servers ASV and the database servers DBSV, various devices that employ the data transmitted by the sensing devices SD.

The storage area of the data memory 13 includes a sensing device information storage unit 131, a device-relay server NW performance storage unit 132, a relay server-application server NW performance storage unit 133, a relay server-database server NW performance storage unit 134, a relay server information storage unit 135, an application server information storage unit 136, and a database server information storage unit 137.

The sensing device information storage unit 131 is used for storage of information relating to individual sensing devices SD, such as the type and transmission frequency of data generated by the sensing devices SD.

The device-relay server NW performance storage unit 132 is used for storage of information on the network performance between each of the sensing devices SD and the relay server 20.

The relay server-application server NW performance storage unit 133 is used for storage of information on the network performance between the relay server 20 and the application servers ASV.

The relay server-database server NW performance storage unit 134 is used for storage of information on the network performance between the relay server 20 and the database servers DBSV. The NW performance storage units 132 and 133 need not be separate units, and may be integrated as a single storage unit.

The relay server information storage unit 135 is used for storage of information relating to the relay server 20, for example the load information of the relay server 20 (e.g., the amount of data received by the relay server 20, and the ratio of a storage area occupied by the temporarily stored sensing data).

The application server information storage unit 136 is used for storage of the information on individual application servers ASV, such as information regarding the data required by the application servers ASV.

The database server information storage unit 137 is used for storage of the information on individual database servers DBSV, such as information regarding the data stored in the database servers DBSV.

The processing unit 12 includes the hardware processor 12A and the program memory 12B. As software-based process functioning units, the processing unit 12 includes a sensing device management unit 121, a network performance monitor unit 122, a relay server management unit 123, an application server management unit 124, and a database server management unit 125. These process functioning units are realized by causing the hardware processor 12A to execute programs stored in the program memory 12B. The processing unit 12 may be implemented in various other forms, including an integrated circuit such as an application specific integrated circuit (ASIC) or a field-programmable gate array (FPGA).

The sensing device management unit 121 is provided with functions of managing the information of all the sensing devices SD under the relay server 20 and adjusting the format of data transmitted from the sensing devices SD and the transmission frequency of such data, in cooperation with the relay server management unit 123. The sensing device management unit 121 includes a sensing device information acquisition unit 1211 and a sensing data transmission control unit 1212.

The sensing device information acquisition unit 1211 is configured to acquire information on the individual sensing devices SD via the communication interface 11, and store the acquired information in the sensing device information storage unit 131. The acquired information of a sensing device SD may include a device ID, a type of data generated by the device, a format of the data, and a transmission frequency of the data.

The sensing data transmission control unit 1212 functions as a transmission control unit for control signals issued to the sensing devices SD, and performs a process of transmitting to each sensing device SD a signal indicating a data transmission frequency, a format of data that is to be transmitted, and the like. For instance, if the load of the relay server 20 reaches or exceeds a certain level upon arrival of a large amount of data at the relay server 20, the load of the relay server 20 can be reduced by reducing the transmission frequency of data from the sensing devices SD or by adopting a data format having a smaller data size. Each sensing device SD transmits data to the relay server 20 in accordance with the data transmission frequency and the data format specified by the sensing data transmission control unit 1212.

The network performance monitor unit 122 monitors the performance of a network relating to the management server 10 or the relay server 20. In this embodiment, the network performance monitor unit 122 includes a device-relay server NW monitor unit 1221, a relay server-application server NW monitor unit 1222, and a relay server-database server NW monitor unit 1223 in order to track the performance information of each network segment. As the network performance, performance information such as the maximum bandwidth and the current usage rate of the network may be monitored. Alternatively, the number of bytes per unit time (bytes/sec) of reception/transmission data at the reception or transmission port of the relay server 20 may be monitored as network performance. The network performance monitor unit 122 may further calculate the optimal frequency of the transmission from each sensing device SD or the relay server 20 in a manner that can reduce the network congestion, and notify the sensing device management unit 121 of the value of the calculated optimal frequency.

The device-relay server NW monitor unit 1221 is configured to monitor the network performance between each of the sensing devices SD and the relay server 20.

The relay server-application server NW monitor unit 1222 is configured to monitor the network performance between the relay server 20 and each of the application servers ASV.

The relay server-database server NW monitor unit 1223 is configured to monitor the network performance between the relay server 20 and each of the database servers DBSV.

The relay server management unit 123 is configured to monitor the load of the relay server 20, manage the scheme of integrating data on the relay server 20, and instruct the relay server 20 on the integration scheme. The relay server management unit 123 includes a relay server load monitor unit 1231, a data integration instruction unit 1232, and a relay control unit 1233.

The relay server load monitor unit 1231 is configured to monitor the load of the relay server 20. The relay server load monitor unit 1231 can directly monitor the load of the relay server 20 by monitoring, for example, the amount of data received by the relay server 20 or the free space of the memory. Alternatively, the relay server load monitor unit 1231 may estimate the load of the relay server 20 indirectly from the monitoring result obtained by the network performance monitor unit 122. The relay server load monitor unit 1231 may further determine whether the load of the relay server 20 exceeds a predetermined threshold.

The data integration instruction unit 1232 functions as a relay data instruction unit, and is configured to instruct the relay server 20 regarding the attributes of data to be relayed to individual destination servers DSV based on the requests from the destination servers DSV. The attributes of the data may include the date and time of data acquisition, the ID of the sensing device that has collected and transmitted the data, the data type, and the data format. The data integration instruction unit 1232 generates and transmits a signal for instructing the relay server 20 to identify, sort and integrate the data items to be relayed to individual destination servers DSV. In this embodiment, the data integration instruction unit 1232 is configured to instruct the relay server 20 regarding the scheme of integrating data items to be relayed to the application server ASV (application data) and the scheme of integrating data items to be relayed to the database server DBSV (database data). For example, the data integration instruction unit 1232 may instruct the relay server 20 to select and integrate, for a specific application server ASV1, data items having a specific data format and obtained within a specific time frame.

The relay control unit 1233 functions as a transmission control unit for a control signal to the relay server 20, and is configured to control the transmission (relay) from the relay server 20 to individual destination servers DSV based on the monitoring result of the network performance and the load of the relay server 20. For example, when it is determined that the network performance has been lowered, the relay control unit 1233 prioritizes the destination servers DSV to suppress the amount of communication. The relay control unit 1233 generates and transmits a control signal to the relay server 20 to instruct transmission to a destination server having a higher priority at a higher transmission frequency, and to a destination server having a lower priority at a lower transmission frequency.

In this manner, the relay server management unit 123 has a function of adjusting the loads of the network and the relay server 20 in cooperation with the sensing device management unit 121. For example, if the load of the relay server 20 reaches or exceeds a certain level upon arrival of a large amount of data at the relay server 20, the load of the relay server 20 can be lowered by reducing the frequency of data transmission from the sensing device SD or by adopting a data format having a smaller data size.

The application server management unit 124 manages which data of the sensing devices SD is required by each application included in the application servers ASV among the destination servers DSV. The application server management unit 124 may serve as a request receiving unit, receiving a request for data (or an attribute thereof) required by an application from an application server ASV, and is configured to store the information included in the received request in the application server information storage unit 136. The application server management unit 124 is further configured to notify the relay server management unit 123 that the request has been received. The application server management unit 124 may manage a single application server ASV or multiple application servers ASV.

The database server management unit 125 manages which data of the sensing devices SD should be stored in which of the databases included in the database servers DBSV among the destination servers DSV. The database server management unit 125 may serve as a request receiving unit, receiving from each database server DBSV a request regarding data to be stored in a database, and is configured to store the information included in the received request in the database server information storage unit 137. The database server management unit 125 is further configured to notify the relay server management unit 123 that the request has been received. The database server management unit 125 may manage a single database server DBSV or multiple database servers DBSV.

(3) Relay Server
(3-1) Hardware Configuration

Figure 4:
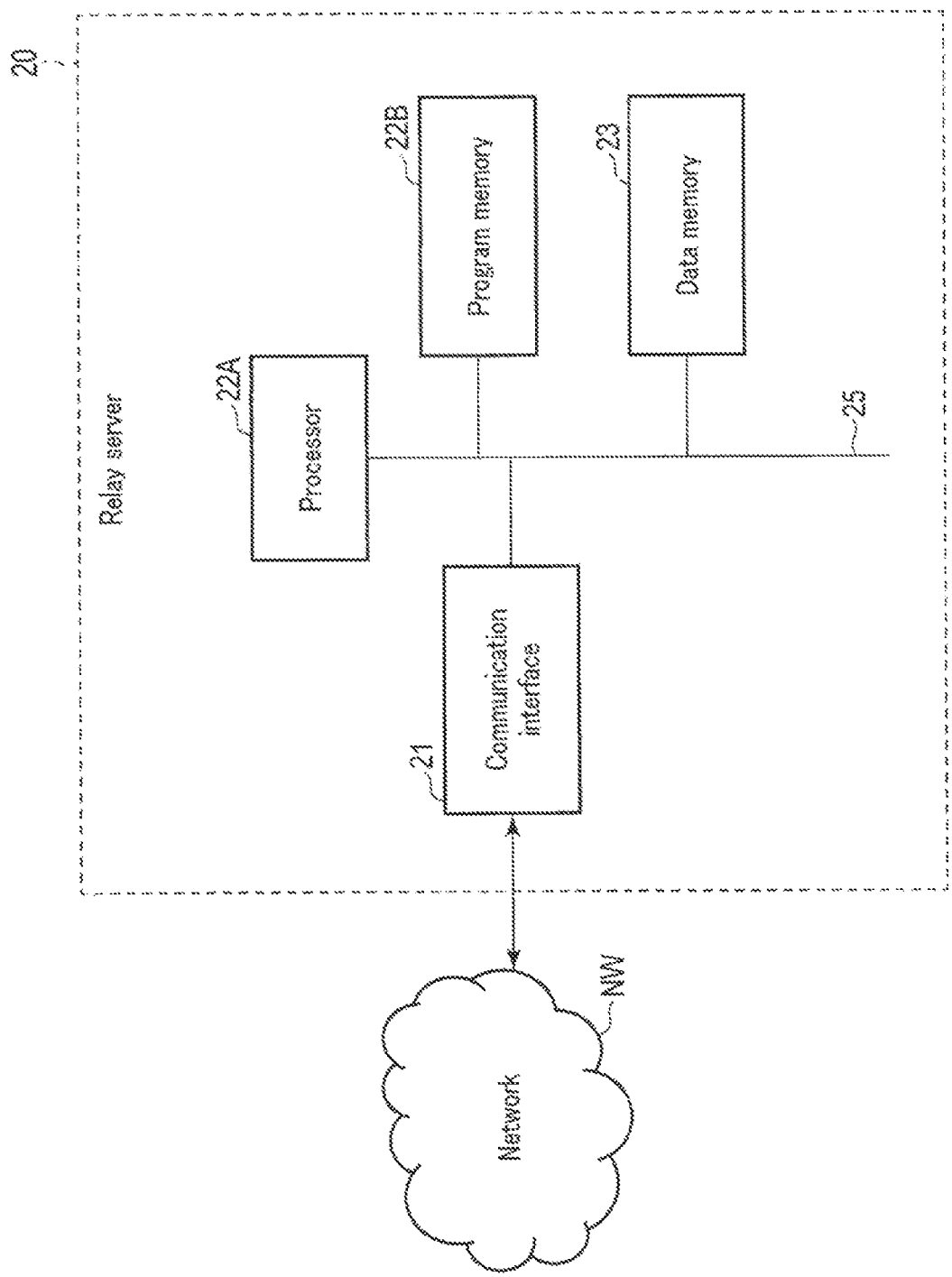
FIG. 4 is a block diagram showing a hardware configuration of a relay server according to an embodiment of the present invention.

FIG. 4 is a block diagram showing an exemplary hardware configuration of the relay server 20 illustrated in FIG. 1.

The relay server 20 may be a server computer, a personal computer, or the like, and may include a hardware processor 22A such as a CPU. The relay server 20 is constituted by connecting a program memory 22B, a data memory 23, and a communication interface 21 to the hardware processor 22A via a bus 25.

The communication interface 21 enables data to be transmitted to and received from various devices through the network NW. As a communication protocol, the protocol defined by the network NW is employed. The communication interface 21 may include one or more wired or wireless communication interfaces. As a wired interface, a wired LAN may be employed. As a wireless interface, an interface adopting a low-power wireless data communication standard such as a wireless LAN or Bluetooth (registered trademark) may be employed.

The program memory 22B serves as a storage medium, for which a combination of a nonvolatile memory such as an HDD or SSD, in which writing and reading can be conducted at any time, and a nonvolatile memory such as a ROM may be used. Programs necessary for executing various processes are stored therein.

The data memory 23 serves as a storage medium, for which a combination of a nonvolatile memory such as an HDD or SSD, in which writing and reading can be conducted at any time, and a volatile memory such as a RAM may be used. The data memory 23 is used for storage of data acquired and created during the various processes.

(3-2) Software Configuration

Figure 5:
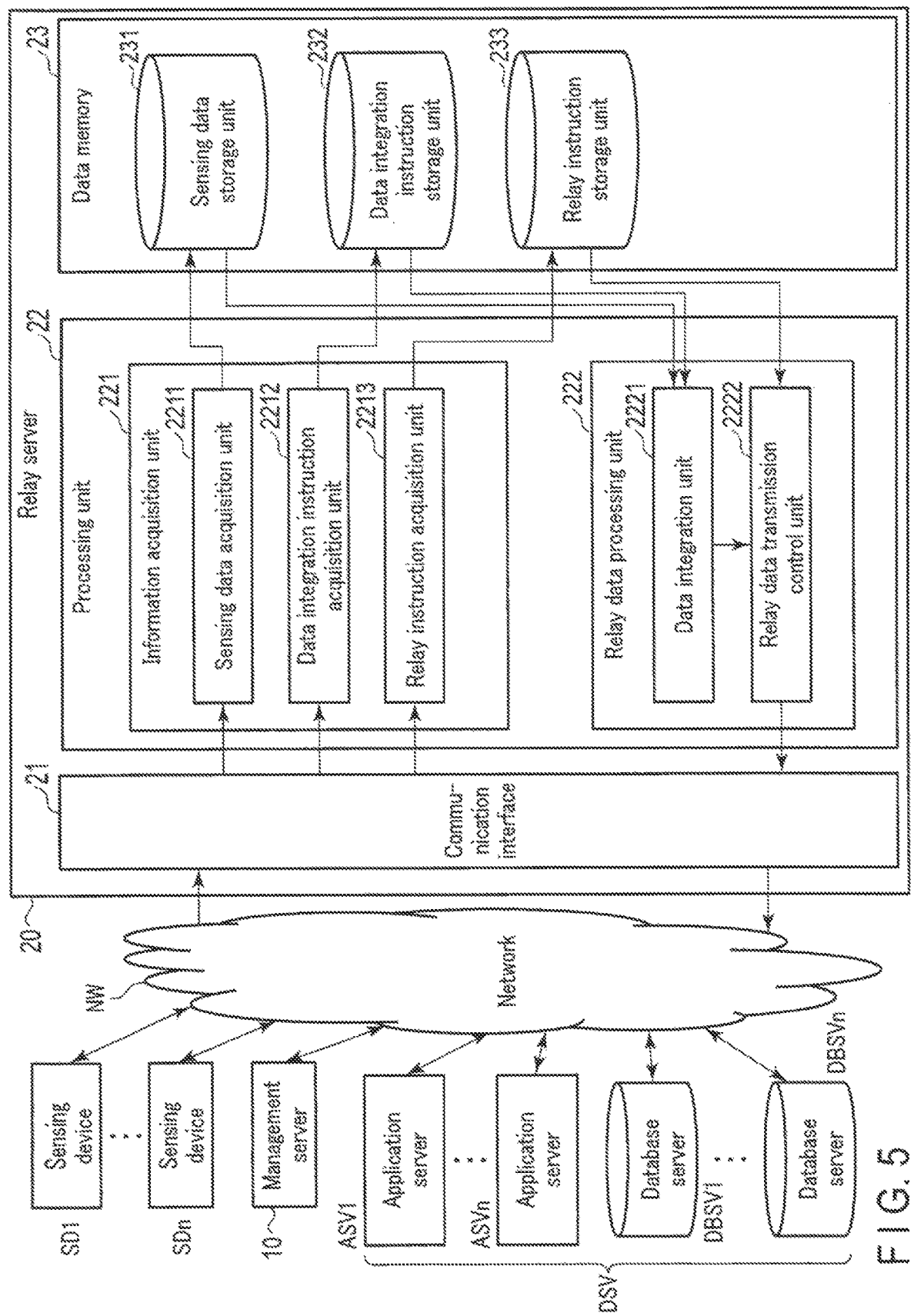
FIG. 5 is a block diagram showing a software configuration of the relay server according to an embodiment of the present invention.

FIG. 5 is a block diagram showing the software configuration of the relay server 20 of FIG. 1 associated with the hardware configuration of FIG. 4.

As described above, the relay server 20 can communicate through the network NW with the sensing devices SD1, . . . , SDn, the management server 10, and also with the application servers ASV1, . . . , ASVn, and the database servers DBSV1, . . . , DBSVn that serve as the destination server DSV. As mentioned earlier, the sensing device SD may include various devices. An application server ASV may include one or more applications. Similarly, a database server DBSV may include one or more databases. The destination server DSV may include, in addition to the application servers ASV and the database servers DBSV, various devices that employ the data transmitted by the sensing devices SD.

The storage area of the data memory 23 includes a sensing data storage unit 231, a data integration instruction storage unit 232, and a relay instruction storage unit 233.

The sensing data storage unit 231 is used for storage of the data acquired from individual sensing devices SD together with device IDs, time information, and the like.

The data integration instruction storage unit 232 is used for storage of an instruction received from the management server 10 regarding integration of the data items to be relayed to individual destination servers DSV.

The relay instruction storage unit 233 is used for storage of the instructions received from the management server 10 regarding relay (transmission) from the relay server 20 to individual destination servers DSV.

The processing unit 22 includes the hardware processor 22A and the program memory 22B. As software-based process functioning units, the processing unit 22 includes an information acquisition unit 221 and a relay data processing unit 222. These process functioning units are implemented when the hardware processor 22A executes a program stored in the program memory 22B. The processing unit 22 may also be implemented in various other forms, including integrated circuits such as ASIC and FPGA.

The information acquisition unit 221 acquires various kinds of information, and includes a sensing data acquisition unit 2211, a data integration instruction acquisition unit 2212, and a relay instruction acquisition unit 2213.

The sensing data acquisition unit 2211 acquires data transmitted from the sensing devices SD through the communication interface 21, and stores the data in the sensing data storage unit 231.

The data integration instruction acquisition unit 2212 is configured to acquire an instruction regarding integration of the data to be relayed to individual destination servers DSV from the management server 10 through the communication interface 21 and store the instruction in the data integration instruction storage unit 232.

The relay instruction acquisition unit 2213 is configured to acquire, from the management server 10 through the communication interface 21, an instruction regarding relay (transmission) of the data from the relay server 20 to individual destination servers DSV and store the instruction in the relay instruction storage unit 233.

The relay data processing unit 222 performs various kinds of processing on the relay data based on various types of information acquired by the information acquisition unit 221, and includes a data integration unit 2221 and a relay data transmission control unit 2222.

The data integration unit 2221 reads the data integration instruction stored in the data integration instruction storage unit 232, and identifies what information is required by the individual destination servers DSV based on the instruction. If the data items required by the destination servers DSV are included in the plural types of data stored in the sensing data storage unit 231, the data items are read out, sorted and integrated in accordance with the destination servers DSV. The integrated data is output to the relay data transmission control unit 2222. Alternatively, the integrated data may be temporarily stored in a storage unit that is not shown in the drawings.

The relay data transmission control unit 2222 is configured to read the relay instruction stored in the relay instruction storage unit 233 and control the relay of the data to the individual destination servers DSV based on the instruction. For example, the relay data transmission control unit 2222 may relay (transmit) the integrated data to the destination servers DSV in accordance with the transmission frequency or transmission priority designated for each of the destination servers DSV, based on the relay instruction.

If a large amount of data is transmitted from the sensing devices SD, or if a large number of sensing devices SD are involved, there is a possibility that congestion of the network may occur if all the received sensing data items are relayed with a high priority. Even if this happens, network congestion can be reduced by controlling the transmission (relay) from the relay server 20 in a manner such that, in accordance with the network performance, only specific data out of plural types of data transmitted from the sensing devices SD is transmitted with high priority, or only data of a device having a specific device ID is transmitted with high priority.

The network management system 100 of the present invention can be realized by a computer and a program. The program can be stored in a storage medium or provided through a network.

(Operations)

Next, the information processing operations of the devices in the network management system 100 configured as above will be described. FIG. 6 is a sequence diagram showing the procedure and descriptions of the processing, and FIG. 7 is a diagram showing a data flow in the system 100.

Figure 7:
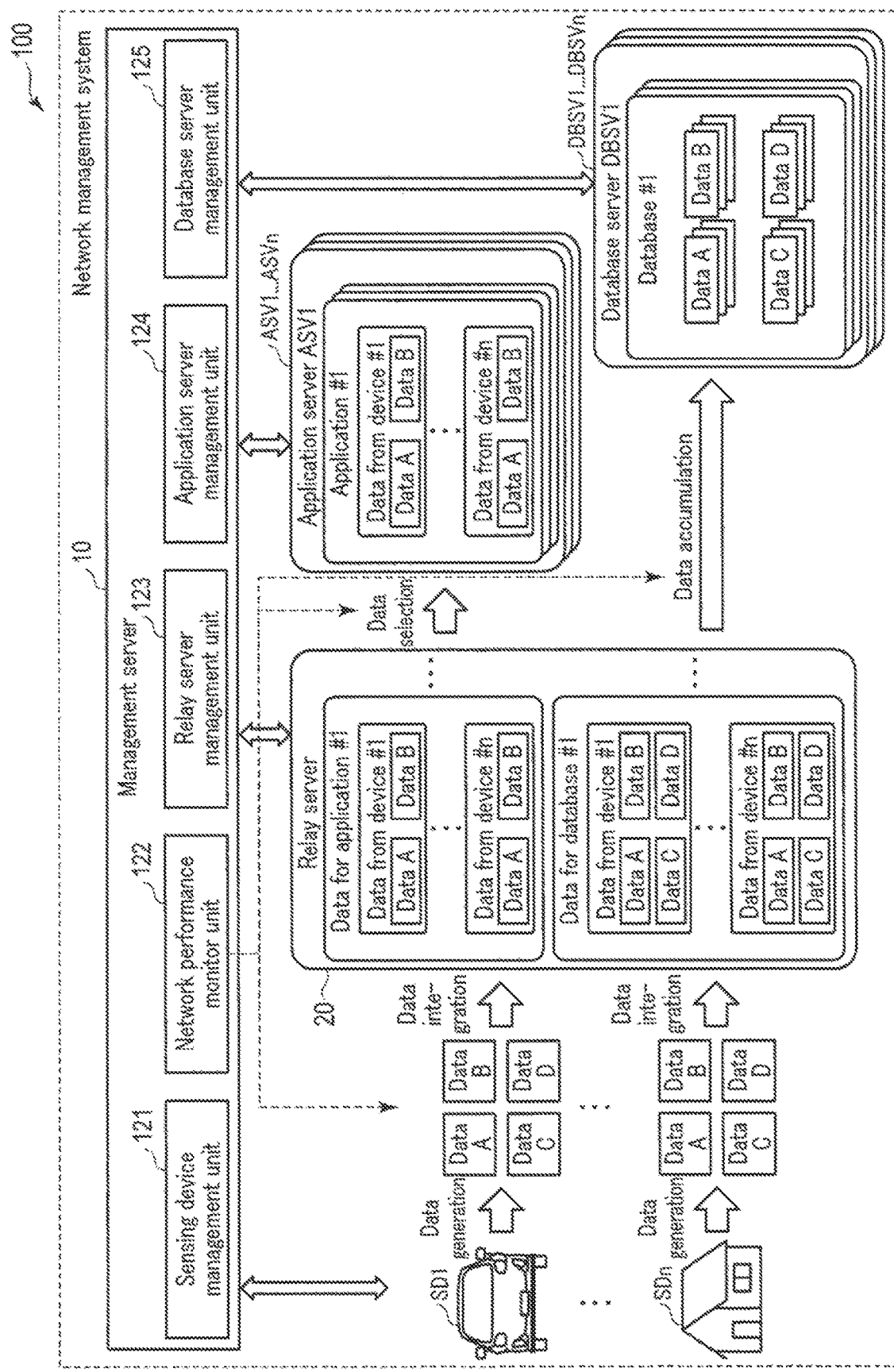
FIG. 7 is a diagram showing an exemplary data flow in the network management system shown in FIG. 1.

The network management system 100 shown in FIGS. 6 and 7 includes a plurality of sensing devices SD as data transmitting terminals, application servers ASV and database servers DBSV as destination devices or destination servers, a relay server 20 arranged between the sensing devices SD and the application servers ASV/database servers DBSV, and a management server 10 communicable with these devices. It is assumed in FIGS. 6 and 7 that communications are established in advance via a network between the sensing devices SD and the relay server 20, between the relay server 20 and the destination servers (application servers ASV and database servers DBSV), and between the management server 10 and each of the sensing devices SD, the relay server 20, and the destination servers.

In this embodiment, each sensing device SD is a device provided with a sensor function for acquiring different types of data (e.g., temperature, humidity, image and sound). These types of data have different data sizes and different frequencies of acquisition. For instance, temperature data is small and can be acquired every second, whereas image data is large and can be acquired every minute. It is assumed in this embodiment for the sake of convenience that the devices SD1, . . . , SDn are provided with the same function, each generating the same four types of data, namely, data A, data B, data C, and data D. The application servers ASV and the database servers DBSV may be installed in different sites.

Each of the sensing devices SD transmits to the relay server 20 various types of data in a predetermined data format at a predetermined transmission frequency, together with information indicating an ID for device identification and an acquisition date and time.

The above data is acquired by the relay server 20 and stored in the sensing data storage unit 231 at step S101.

At step S102, the management server 10 receives a request for necessary data from individual destination servers DSV (from the application servers ASV1, . . . , ASVn and the database servers DBSV1, . . . , DBSVn in this embodiment) under the control of the application server management unit 124 and the database server management unit 125, respectively. The application server management unit 124 acquires information on the data required by each application placed under its management, stores the information in the application server information storage unit 136, and notifies the relay server management unit 123 of the information. The database server management unit 125 acquires information on the data that should be stored in each of the databases placed under its management, stores the information in the database server information storage unit 137, and notifies the relay server management unit 123 of the information.

In this embodiment as shown in FIG. 7, of the data A, data B, data C and data D, two types of data, data A and data B, are required for the operation of application #1 included in the application server ASV1, while four types of data, data A, data B, data C and data D, are required for database #1 included in the database server DBSV1. The processing orders of the data acquisition by the relay server 20 and the request reception by the management server 10 are illustrated merely for the sake of simplicity in FIG. 6, and these processes may be performed in any desired order at any desired timing.

Upon receiving the request from a destination server DSV through the application server management unit 124 and the database server management unit 125, the management server 10 generates and transmits a data integration instruction to instruct the relay server 20 to integrate data items that are to be relayed to the destination server DSV under the control of the relay server management unit 123 at step S103. For instance, the management server 10 may transmit a data integration instruction to the relay server to integrate the data A and the data B for the application #1 or to integrate the data A, data B, data C and data D for the database #1.

At step S104, the relay server 20, which has received this data integration instruction, selectively reads from the sensing data storage unit 231 the data required for each destination server DSV from among the data items transmitted from the sensing devices SD, and combines the read-out data items, under the control of the data integration unit 2221. For instance, for the application #1 included in the application server ASV1, the relay server 20 reads the data A and the data B from the data items transmitted from the sensing devices SD, and performs a process of archiving (compressing) the data A and the data B into a single file. Similarly, the relay server 20 selectively reads the data A, data B, data C, and data D required by the database #1 included in the database server DBSV1 from the sensing data storage unit 231 and integrates the data into a single file, under the control of the data integration unit 2221.

When the application server ASV1 includes a plurality of applications, data items may be selected and integrated for individual applications, and the integrated data may be reintegrated for the application server ASV1.

At step S105, the management server 10 monitors the network performance, such as the maximum bandwidth and current usage rate of the network, and determines whether the bandwidth of the network is sufficient, under the control of the network performance monitor unit 122. Any network can be included as a monitoring target. In this embodiment, it is assumed for the sake of convenience that the network between the relay server and the destination servers DSV is monitored at step S105.

At step S106, under the control of the network performance monitor unit 122 and the relay server management unit 123, the management server 10 is configured to generate a data relay instruction for controlling the operation of the relay server 20 so as to reduce the load of the communication path based on the result of monitoring the network performance, and transmit this instruction to the relay server 20. If it is determined that the bandwidth of the network is not sufficient, the management server 10 can generate an instruction to lower the transmission frequency of the data to be transmitted from the relay server 20 to the database servers DBSV and transmit the instruction to the relay server 20 so as to relay the data preferentially from the relay server 20 to the application servers ASV, without causing any network congestion.

Upon receiving the data relay instruction from the management server 10, the relay server 20 relays (transmits) the integrated data to the individual destination servers DSV in accordance with this instruction at step S107. For instance, the relay server 20 may lower the frequency of the transmission to the database servers DSBV and transmit the data preferentially to the application servers ASV. In this manner, the data can be efficiently relayed to the application servers without causing network congestion.

Furthermore, at step S108, the management server 10 monitors the network performance between the sensing devices SD and the relay server 20 and the load of the relay server 20. For instance, the management server 10 may monitor the amount of data received by the relay server 20 under the control of the relay server load monitor unit 1231.

The management server 10 is configured to suppress the amount of transmission from the sensing devices SD to the relay server 20 when it is determined that the network performance has been lowered or that the amount of data received by the relay server 20 exceeds a certain threshold. That is, at step S109, the management server 10 may generate a data transmission instruction indicating the optimal transmission frequency or transmission data format and transmit the instruction to the sensing devices SD, under the control of the sensing data transmission control unit 1212. The processing of steps S108 to S109 is not limited to the illustrated timings, and may be performed at any timing.

Upon receiving the data transmission instruction from the management server 10, each sensing device SD continues to transmit data to the relay server 20 in accordance with the instructed transmission frequency or data format.

As described above, the operations in FIG. 6 are merely shown in an exemplary order for the sake of convenience. The operations are not limited to the example of FIG. 6, and can be performed at any timing.

(Effects)

As described above, in the first embodiment, for the use of data including IoT-use information through a network, the relay server 20 is arranged between the sensing devices SD that acquire the data and the destination servers DSV that use the data, and multiple data items are integrated on a communication path. In this manner, data exchange can be realized in which data can be efficiently collected from a wide variety and vast number of the sensing devices SD, and the data can be suitably transmitted to and received from various applications in a scalable manner.

That is, in a case of accumulating data from the sensing devices SD and using the data for an application, the data is sorted and integrated on the relay server 20 so that the data can be efficiently relayed to the application servers ASV and the database servers DBSV. The application server ASV receives only the data required by the server itself from the relay server 20, and therefore does not need to retrieve the required data from a massive amount of data stored in the database. Even if the data is transmitted from a vast number of sensing devices SD, the relay server 20 sorts and relays only the required data so that each application can efficiently and directly acquire data. According to the first embodiment, even when the number of applications placed under its management increases, the management server 10 can perform the optimum data integration for each application on the relay server 20 and thereby efficiently transmit the data from the relay server 20 to individual application servers ASV.

There has been a problem wherein the network segment from the sensing devices to the database is congested when a large amount of data is transmitted from the sensing devices or when a large number of devices are involved, increasing the amount of data transmission. As described in the first embodiment described above, however, by arranging the relay server 20 between the sensing devices SD and the destination servers DSV and having the sensing device management unit 121 and the relay server management unit 123 cooperate with each other in the relay server 20, the format and transmission frequency of the data transmitted from the sensing devices SD can be adjusted in accordance with the network performance. For instance, when a large amount of data is received by the relay server 20 and the load of the network or the relay server 20 exceeds a certain threshold value, the frequency of data transmission from the sensing devices SD can be lowered or a data format having a smaller data size can be adopted so that the load of each network and the relay server 20 can be reduced. That is, according to the first embodiment, the network performance monitor unit 122 notifies the sensing device management unit 121 of the performance of the network from the sensing devices SD to the relay server 20 so that the management server 10 can control the transmission frequency of data transmitted from each of the sensing devices SD and set the frequency to an optimum value, thereby avoiding network congestion.

Similarly, the network performance monitor unit 122 notifies the relay server management unit 123 of the performance of the network from the relay server 20 to the destination servers DSV so that the management server 10 can optimally control the transmission frequency or transmission priority of data relayed (transmitted) from the relay server 20, and the congestion of the network between the relay server 20 and the destination servers DSV can be thereby avoided. Furthermore, as described above, by determining the priority order in relaying the data from the relay server 20 to the destination servers DSV, the utilization efficiency of communication resources can be enhanced while avoiding congestion.

As discussed above, according to the first embodiment, data can be efficiently used in an IoT environment in which a wide variety of information is acquired as a large amount of sensing data, by integrating a plurality of data items on a communication path. As a result, a wide variety of data can be distributed and used across services in different fields, and further value creation can be realized in the IoT.

Embodiment 2

A network management system 100 according to the second embodiment of the present invention is a driving support system for an automobile having a network communication function. For the second embodiment, the same configuration as the one described with reference to FIGS. 1 to 7 in relation to the first embodiment may be adopted. The same reference numerals will be used below as those of the first embodiment, and detailed descriptions that overlap with the first embodiment will be omitted.

An exemplary network management system 100 according to the second embodiment of the present invention can be implemented as follows:

Sensing devices SD: Vehicles
NW1: Cellular phone network
NW2, NW3: Optical fiber networks
Relay server 20: Edge server
Application server ASV1: Server with driving command function
Application server ASV2: Server with function of creating and distributing a dynamic map (on which moving objects are also shown)
Database server DBSV1: Server storing traffic jam/accident map
Database server DBSV2: Server storing road-sign/lane maps In general, a vehicle SD carries a plurality of sensors such as a GPS receiver, a gyro sensor, a camera, and a LiDAR distance measuring sensor so that the position of the vehicle itself and its surroundings can be sensed. The vehicle SD is further equipped with an in-vehicle device (not shown) having a communication function, and this in-vehicle device collects the sensor data. The device also mirrors a controller area network (CAN) communication packet and thereby collects information on the internal configuration of the vehicle such as the revolutions of the engine, the opening of the accelerator, the brake pressure, and the steering angle of the steering wheel. The in-vehicle device transmits the collected data to the edge server 20 through the cellular phone network NW1 or the like.

The generation frequency of the sensor data varies depending on the sensor type; approximately 10 times per second for the positional information, approximately 24 to 60 frames per second for camera images, and approximately 5 to 20 frames per second for the LiDAR point cloud data. The generation frequency of CAN packets varies depending on the vehicle model and the model year.

From the aspect of the data size, the sizes of camera images and the LiDAR point cloud can be as large as several megabytes, which requires time for data transmission. On the other hand, a CAN packet can be as small as several bytes, which takes a short time for data transmission. For this reason, even if a camera image and a CAN packet are acquired at the same time in the vehicle SD, a difference tends to be produced in their transmission completion time points.

Moreover, the frequency of data acquisition required by a destination server DSV varies greatly depending on its purpose. For instance, for the purpose of the driving command function, it is desirable to acquire data as frequently as possible. On the other hand, data may be sufficiently acquired every several seconds for the purpose of creating a dynamic map, every several minutes for the purpose of updating a traffic jam/accident map, and every several days to several months for the purpose of updating a road sign/lane map.

Furthermore, with regard to the coverage of data to be acquired, data collection from all vehicles may be necessary for some uses, and duplication of data should be excluded for some other uses. For instance, with the driving command function, collection of data from all vehicles is essential. On the other hand, in the creation of a dynamic map and updating of a traffic jam/accident map, data collected in a manner such that the sensing ranges do not overlap based on information such as the position and traveling direction of each vehicle will suffice. Thus, from the point of view of reduction of the load of the data analysis, it is desirable to remove the overlapping data.

With a conventional technique, in order to meet such complex requests, the sensor data is collected from all the vehicles SD and accumulated in the database so that an application server ASV needs to issue an SQL query to the database server DBSV to acquire the necessary data. With such a technique, the database is expanded and data retrieval requires a long time. In addition, with all the generated sensor data flowing into the cellular phone network, the varying load on the cellular phone network due to the temporal variation in the number of vehicles traveling cannot be kept under control.

In the network management system 100 according to the second embodiment, the application server management unit 124 of the management server 10 is configured to receive a request regarding data required by an application from an application server ASV and to store the information included in the received request in the application server information storage unit 136, at step S102 in the same manner as explained in the first embodiment. In the second embodiment, the application server ASV1 having a driving command function may request data collection from all the vehicles as frequently as possible. On the other hand, the application server ASV2 having the function of creating and distributing a dynamic map does not need to collect data from all the vehicles, but may request collection of data at a frequency of every several seconds in a manner such that sensing ranges do not overlap with each other based on the information of the positions and traveling directions of the vehicles.

In the network management system 100 according to the second embodiment, at step S102 in the same manner as explained in the first embodiment, the database server management unit 125 of the management server 10 is configured to receive from each database server DBSV a request regarding data to be accumulated in a database, and to store the information included in the received request in the database server information storage unit 137. In the second embodiment, the database server DBSV1 storing the traffic jam/accident map may request data transmission every several minutes in order to update the map. On the other hand, the database server DBSV2 storing the road sign/lane map may request data transmission every several days to several months, and therefore the data transmission from the vehicle SD to the edge server 20 can be performed in any time frame. These database servers DBSV1 and DBSV2 do not need to collect data from all the vehicles, but it is sufficient if the data whose sensing ranges do not overlap each other based on information such as the positions and traveling directions of the vehicles is collected.

Accordingly, in response to the above request, the management server 10 may generate a control signal for instructing the vehicle SD that serves as a sensing device to transmit the necessary data to the relay server (edge server) 20 at a necessary frequency or timing, and transmit this control signal to the vehicle SD at step S109, under the control of the sensing data transmission control unit 1212. For instance, the management server 10 may generate a control signal indicating a type of data to be transmitted to the relay server 20, a frequency of transmission to the relay server 20, and a time frame or timing of transmission to the relay server 20, and transmit the control signal to the individual vehicles SD, under the control of the sensing data transmission control unit 1212.

In the above operation, the management server 10 can adjust the description of the instruction in the control signal, for instance, the attribute of the data (e.g., data size and data format), the transmission frequency, the transmission time frame, the transmission timing, and the like, based on the monitoring result obtained from the network performance monitor unit 122. In particular, the management server 10 according to the second embodiment can generate and transmit a control signal to individual vehicles SD so as to control the load of the network NW1 as a cellular phone network based on the monitoring result of the device-relay server NW monitor unit 1221.

For example, when it is determined that the cellular phone network NW1 is under a high load, the management server 10 may instruct the vehicles SD to compress the data and transmit the compressed data to the relay server 20, to reduce the transmission frequency, or to change the transmission time frame from the late-night time frame to the early morning time frame under the control of the sensing data transmission control unit 1212. Alternatively, the management server 10 may instruct the vehicles SD to perform transmissions in accordance with the data format, for example transmitting image data in a batch at night while transmitting CAN packets at specific intervals such as every 10 minutes, under the control of the sensing data transmission control unit 1212.

Upon receiving the control signal, each of the vehicles SD may, for example, change the sampling frequency to adjust the data size in accordance with the instruction, and transmit the data to the relay server 20 at the instructed timing. Each vehicle SD may also accumulate the sensing data in the storage unit of the in-vehicle device and transmit the sensing data in a batch within the time frame instructed in the control signal from the management server 10.

Further, the management server 10 may be configured to transmit different control signals to the vehicles SD. For example, the management server 10 may instruct randomly selected vehicles SD to suspend the transmission to the relay server 20 for a certain period of time. The vehicles SD that have received this instruction suspend the transmission of the sensing data for the instructed period of time. The management server 10 may instruct these vehicles SD to discard the sensing data of the transmission suspended period, or may instruct the vehicles SD to store the sensing data in the storage unit and transmit the sensing data in a batch when the transmission is resumed.

(Effects)

According to the second embodiment, the management server 10 may instruct each sensing device SD to transmit only the necessary data to the relay server 20 in response to a request from the destination server DSV. Since the minimum sensor data required by the application is selectively collected, the load on the cellular phone network NW1 can be minimized. In addition, the load on the cellular phone network NW1 can be leveled by transmitting data whose real-time properties are not particularly required, such as images used for updating the road sign/lane map, in a batch in the late-night time frame during which there is leeway in the communication band.

In addition, according to the present invention, since a plurality of data items that are integrated into one batch are transmitted to the destination server DSV, no data queuing is required at a downstream stage of the application, and therefore no processing delay relating to queuing occurs.

Furthermore, as a secondary effect of the data integration function of the present invention, the overhead of TCP/IP communication can be reduced during the transmission of a small amount of data, thereby improving the utilization efficiency of the network. This can be realized because, with the data items integrated, the payload can be increased and the packet length can be extended, which means that the ratio of the header to the entire packet can be reduced.

OTHER EMBODIMENTS

The present invention is not limited to the above embodiments.

For instance, in the above-described embodiments, in the transmission of data from the relay server 20 to the destination servers DSV, the transmission priority order is determined for each of the destination servers DSV. The priority order, however, may be determined from other aspects. For example, the priority order may be determined for each type or device ID of the sensing device SD, for each type of the sensing data, or for each type of the destination server DSV. The priority order may be determined in advance, or may be dynamically adjusted. Alternatively, a plurality of conditions corresponding to network performance may be preset so that when the traffic exceeds a certain amount, only a relay with a high priority may be conducted. In this manner, the responsiveness of the application and the efficiency of the resource can be flexibly controlled.

The specific operations by the units of the management server 10 or the relay server 20 are not limited to the above descriptions in the embodiments. For example, in the above embodiments, the network performance monitor unit 122 of the management server 10 is explained as calculating the optimum data transmission frequency at which the network will not be congested. The calculation, however, may be implemented by other processing units such as the sensing data transmission control unit 1212, the relay server load monitor unit 1231, or the relay control unit 1233 of the management server 10, or may be implemented by a combination thereof.

Moreover, in the above embodiments, a plurality of terminals or sensing devices SD, a single relay device or relay server 20, a plurality of application servers ASV, a plurality of database servers DBSV, a plurality of applications, and a plurality of databases are included. These components may be included as a single component or multiple components. Some of the functions of the management server 10 may be provided in the relay server 20, or some of the functions of the relay server 20 may be provided in the management server 10. Further, the relay server 20 may be designed such that the integration of data items can be performed in any desired units such as for each application, for each application server, for each database, or for each database server.

Furthermore, in the above embodiments, the application server ASV and the database server DBSV are described as examples of the destination servers DSV to which the relay server 20 relays the data transmitted from the sensing device SD, but other servers or devices may be included.

In addition, modifications can be made to the sensing devices SD and the types of sensing data without departing from the scope of the present invention.

In short, the present invention is not limited to the above-described embodiments as they are, and can be embodied by modifying the structural components without departing from the scope of the present invention. In addition, various inventions can be made by appropriately combining a plurality of components disclosed in the above embodiments. For example, some components may be removed from the components of the embodiments. Further, components of different embodiments may be appropriately combined.

(Supplementary Notes)

Part or all of the above-described embodiments can be described as shown in the supplementary notes below in addition to the claims, but are not limited thereto.

[C1]

A network management system comprising a plurality of terminals that can transmit data, a plurality of destination devices that perform respective predetermined processes based on the data transmitted from the terminals, a relay device arranged between the terminals and the destination devices via a network, and a management device communicable with the terminals, the destination devices, and the relay device, wherein the management device comprises:
a request receiving unit configured to receive from the destination devices a request regarding data required by individual ones of the destination devices; and
a relay data instruction unit configured to, in response to the request, generate a relay data instruction signal that instructs an attribute of the data to be relayed to the individual ones of the destination devices and transmit the relay data instruction signal to the relay device, and the relay device comprises:
an instruction signal acquisition unit configured to acquire the relay data instruction signal transmitted from the management device;
a data integration unit configured to, based on the relay data instruction signal, identify and integrate data items that are to be relayed to the individual ones of the destination devices from among data items transmitted from the terminals; and
a relay data transmission control unit configured to transmit the integrated data to corresponding ones of the destination devices.

[C2]

The network management system according to C1, wherein the management device further comprises:
a network performance monitor unit configured to monitor performance of the network; and
a transmission control unit configured to, based on a monitoring result of the performance of the network, generate a control signal to control at least one of an amount of data transmitted from the terminals and an amount of data transmitted from the relay device and transmit the control signal to at least one of the terminals and the relay device.

[C3]

A management device communicable with a plurality of terminals that can transmit data, with a plurality of destination devices that perform respective predetermined processes based on the data transmitted from the terminals, and with a relay device arranged between the terminals and the destination devices via a network, the management device comprising:
a request receiving unit configured to receive from individual ones of the destination devices a request regarding data required by the destination devices; and
a relay data instruction unit configured to, in response to the request, generate a relay data instruction signal that instructs an attribute of the data to be relayed to the individual ones of the destination devices and transmit the relay data instruction signal to the relay device.

[C4]

A relay device arranged via a network between a plurality of terminals that can transmit data and a plurality of destination devices that perform respective predetermined processes based on the data transmitted from the terminals, the relay device comprising:
an instruction signal acquisition unit configured to acquire a relay data instruction signal that instructs data to be relayed to individual ones of the destination devices;
a data integration unit configured to, based on the relay data instruction signal, identify and integrate, from among data items transmitted from the terminals, data items to be relayed to the individual ones of the destination devices; and
a relay data transmission control unit configured to transmit the integrated data items to corresponding ones of the destination devices.

[C5]

A method implemented by a management device communicable with a plurality of terminals that can transmit data, with a plurality of destination devices that perform respective predetermined processes based on the data transmitted from the terminals, and with a relay device arranged between the terminals and the destination devices via a network, the method comprising:
receiving by the management device a request regarding data required by individual ones of the destination devices, from the destination devices; and
in response to the request, generating by the management device a relay data instruction signal that instructs an attribute of data to be relayed to the individual ones of the destination devices and transmitting the relay data instruction signal to the relay device.

[C6]

A method implemented by a relay device arranged via a network between a plurality of terminals that can transmit data and a plurality of destination devices that perform respective predetermined processes based on the data transmitted from the terminals, the method comprising:
acquiring by the relay device a relay data instruction signal that instructs data to be relayed to individual ones of the destination devices;
identifying and integrating, by the relay device, data items to be relayed to the individual ones of the destination devices, from among data items transmitted from the terminals based on the relay data instruction signal; and
transmitting by the relay device the integrated data items to corresponding ones of the destination devices.

[C7]

A program that causes a processor to perform the respective processes by the units of the management device according to C3.

[C8]

A program that causes a processor to perform the respective processes by the units of the relay device according to C4.

[C9]

The management device according to C3 further comprising:
a network performance monitor unit configured to monitor performance of the network; and
a transmission control unit configured to generate a control signal to control at least one of an amount of data transmitted from the terminals and an amount of data transmitted from the relay device based on a monitoring result of the performance of the network and transmit the control signal to at least one of the terminals and the relay device.

[C10]

The management device according to C3, further comprising:
a network performance monitor unit configured to monitor performance of the network; and
a transmission control unit configured to generate a control signal to control at least one of a frequency of data transmission from the terminals and a frequency of data transmission from the relay device, based on a monitoring result of the performance of the network, and transmit the control signal to at least one of the terminals and the relay device.

[C11]

The management device according to C3, further comprising a transmission control unit configured to determine a priority order for the destination devices, generate a control signal that instructs to control the transmission of data to the destination devices in accordance with the priority order, and transmit the control signal to the relay device.

[C12]

The management device according to C3, further comprising a transmission control unit configured to, in response to the request regarding data required by the individual ones of the destination devices, generate a control signal to control at least one of a type of data to be transmitted from the terminals to the relay device, a frequency of transmission from the terminals to the relay device, and a time frame of transmission from the terminals to the relay device, and transmit the control signal to the terminals.

[C13]

A network management system (100) comprising a plurality of terminals that can transmit data (SD), a plurality of destination devices (DSV) that perform respective predetermined processes based on the data transmitted from the terminals, a relay device (20) arranged between the terminals (SD) and the destination devices (DSV) via a network, and a management device (10) communicable with the terminals (SD), the destination devices (DSV), and the relay device (20), wherein
the management device (10) comprises:
a request receiving unit (124, 125) configured to receive a request regarding data required by individual ones of the destination devices (DSV), from the destination devices; and
a relay data instruction unit (1232) configured to, in response to the request, generate a relay data instruction signal that instructs an attribute of data to be relayed to individual ones of the destination devices (DSV), and transmit the relay data instruction signal to the relay device, and
the relay device (20) comprises:
an instruction signal acquisition unit (2212) configured to acquire the relay data instruction signal transmitted from the management device;
a data integration unit (2221) configured to identify and integrate, based on the relay data instruction signal, data items to be relayed to the individual ones of the destination devices from among data items transmitted from the terminals; and
a relay data transmission control unit (2222) configured to transmit the integrated data items to corresponding ones of the destination devices.

[C14]

A management device (10) used in the system according to C13.

[C15]

The management device (10) according to C14 comprising:
a network performance monitor unit (122) configured to monitor performance of the network; and
a transmission control unit (1212, 123) configured to, based on a monitoring result of the performance of the network, generate a control signal to control at least one of an amount of data transmitted from the terminals and an amount of data transmitted from the relay device, and transmit the control signal to at least one of the terminals and the relay device.

[C16]

The management device (10) according to C14, further comprising:
a network performance monitor unit (122) configured to monitor performance of the network; and
a transmission control unit (1212, 1233) configured to, based on a monitoring result of the performance of the network, generate a control signal to control at least one of a frequency of data transmission from the terminals and a frequency of data transmission from the relay device, and transmit the control signal to at least one of the terminals and the relay device.

[C17]

The management device (10) according to C14, further comprising a transmission control unit (1233) configured to determine a priority order for the destination devices, generate a control signal to instruct to control data transmission to the destination devices in accordance with the priority order, and transmit the control signal to the relay device.

[C18]

The management device (10) according to C14, further comprising a transmission control unit (1233) configured to, in response to the request for the data required by individual ones of the destination devices, generate a control signal to control at least one of a type of data transmitted from the terminals to the relay device, a transmission frequency from the terminals to the relay device, and a transmission time frame from the terminals to the relay device, and transmit the control signal to the terminals.

[C19]

A relay device (20) used in the system according to C13.

[C20]

A method implemented by a management device (10) of the system according to C13, the method comprising:
receiving by the management device a request regarding data required by individual ones of the destination devices from the destination devices; and
in response to the request, generating by the management device a relay data instruction signal that instructs an attribute of data to be relayed to individual ones of the destination devices and transmitting the relay data instruction signal to the relay device.

[C21]

A method implemented by a relay device (20) of the system according to C13, the method comprising:
acquiring by the relay device a relay data instruction signal to instruct data to be relayed to individual ones of the destination devices;
identifying and integrating by the relay device, data items to be relayed to the individual ones of the destination devices, from among data items transmitted from the terminals based on the relay data instruction signal; and transmitting by the relay device the integrated data items to the individual ones of the destination devices.

[C22]

A program that, when implemented by a computer, causes the computer to implement the method according to C20.

[C23]

A program that, when implemented by a computer, causes the computer to implement the method according to C21.

REFERENCE SIGNS LIST

10 Management server
11 Communication interface
12 Processing unit
12A Hardware processor
12B Program memory
13 Data memory
15 Bus
20 Relay server
21 Communication interface
22 Processing unit
22A Hardware processor
22B Program memory
23 Data memory
25 Bus
100 Network management system
121 Sensing device management unit
122 Network performance monitor unit
123 Relay server management unit
124 Application server management unit
125 Database server management unit
131 Sensing device information storage unit
132 Device-relay server NW performance storage unit
133 Relay server-application server NW performance storage unit
134 Relay server-database server NW performance storage unit
135 Relay server information storage unit
136 Application server information storage unit
137 Database server information storage unit
221 Information acquisition unit
222 Relay data processing unit
231 Sensing data storage unit
232 Data integration instruction storage unit
233 Relay instruction storage unit
1211 Sensing device information acquisition unit
1212 Sensing data transmission control unit
1221 Device-relay server NW monitor unit
1222 Relay server-application server NW monitor unit
1223 Relay server-database server NW monitor unit
1231 Relay server load monitor unit
1232 Data integration instruction unit
1233 Relay control unit
2211 Sensing data acquisition unit
2212 Data integration instruction acquisition unit
2213 Relay instruction acquisition unit
2221 Data integration unit
2222 Relay data transmission control unit

The invention claimed is:

1. A management device communicable with a plurality of terminals that can transmit data, with a plurality of destination devices that perform respective predetermined processes based on the data transmitted from the terminals, and with a relay device arranged via a network between the terminals and the destination devices, the management device comprising a processor and a memory coupled to the processor, wherein the processor is configured to:
receive from the destination devices a request regarding data required by individual ones of the destination devices, and store the request in the memory; and
monitor performance of a network between the terminals and the relay device, a load of the relay device, or performance of a network between the relay device and the destination devices;
based on a result of the monitoring and the request stored in the memory, generate a relay data instruction signal that provides instructions regarding an attribute of data to be relayed to the individual ones of the destination devices, a scheme for integrating the data, and a frequency with which the integrated data is transmitted in order to selectively read data items to be relayed to the individual ones of the destination devices from among data items transmitted from the terminals, integrate the data items into one file and perform transmission at the instructed frequency; and transmit the relay data instruction signal to the relay device.

2. The management device according to claim 1, wherein the processor is further configured to:
based on the result of the monitoring, generate a control signal to control an amount of data transmitted from the terminals to the relay device or a format of the data, and transmit the control signal to the terminals.

3. The management device according to claim 1, wherein the processor is further configured to:
based on the result of the monitoring, generate a control signal to control a frequency of data transmission from the terminals to the relay device, and transmit the control signal to the terminals.

4. The management device according to claim 1, wherein the processor is further configured to:
determine a priority order for the destination devices, generate a control signal that instructs to transmit the integrated data to the destination devices at a frequency of data transmission corresponding to the priority order, and transmit the control signal to the relay device.

5. The management device according to claim 1, wherein the processor is further configured to:
based on the request stored in the memory, generate a control signal to control a type of data transmitted from the terminals to the relay device or a time frame of transmission from the terminals to the relay device, and transmit the control signal to the terminals.

6. A management method implemented by a management device communicable with a plurality of terminals that can transmit data, with a plurality of destination devices that perform respective predetermined processes based on the data transmitted from the terminals, and with a relay device arranged between the terminals and the destination devices via a network, the management device comprising a processor and a memory, the method comprising:
receiving by the management device from the destination devices, a request regarding data required by individual ones of the destination devices, and storing the request in the memory;
monitoring, by the management device, performance of a network between the terminals and the relay device, a load of the relay device, or performance of a network between the relay device and the destination devices; and
based on a result of the monitoring and the request stored in the memory, generating by the management device a relay data instruction signal that provides instructions regarding an attribute of data to be relayed to the individual ones of the destination devices, a scheme for integrating the data, and a frequency with which the integrated data is transmitted in order to selectively read data items to be relayed to the individual ones of the destination devices from among data items transmitted from the terminals, integrate the data items into one file and perform transmission at the instructed frequency, and transmitting the relay data instruction signal to the relay device.

7. A non-transitory tangible computer readable storage medium storing a program for operation management of a management device communicable with a plurality of terminals that can transmit data, with a plurality of destination devices that perform respective predetermined processes based on the data transmitted from the terminals, and with a relay device arranged between the terminals and the destination devices via a network, the program comprising commands to cause a processor to:

receive a request regarding data required by individual ones of the destination devices from the destination devices;

monitor performance of a network between the terminals and the relay device, a load of the relay device, or performance of a network between the relay device and the destination devices; and in response to a result of the monitoring and the request, generate a relay data instruction signal that provides instructions regarding an attribute of data to be relayed to the individual ones of the destination devices, a scheme for integrating the data, and a frequency with which the integrated data is transmitted in order to selectively read data items to be relayed to the individual ones of the destination devices, integrate the data items into one file and perform transmission at the instructed frequency; and transmit the relay data instruction signal to the relay device.

* * * * *